United States Patent [19]
Bucalo

[11] 3,707,957
[45] Jan. 2, 1973

[54] VAS VALVE

[75] Inventor: Louis Bucalo, Holbrook, N.Y.

[73] Assignee: Investors In Ventures, Inc., New York, N.Y.

[22] Filed: Jan. 4, 1971

[21] Appl. No.: 103,606

[52] U.S. Cl. .................................128/1 R, 251/315
[51] Int. Cl. ...........................................A61b 19/00
[58] Field of Search .........128/1 R, 303 R, 274, 247; 251/315

[56] References Cited

UNITED STATES PATENTS

| 3,613,661 | 10/1971 | Shah | 128/1 R |
| 1,858,054 | 5/1932 | Miller | 128/229 |
| 982,815 | 1/1911 | Hobbs | 251/315 |
| 1,327,984 | 1/1920 | Campbell | 251/315 |
| 3,448,961 | 6/1969 | Enssle | 251/315 X |

Primary Examiner—Dalton L. Truluck
Attorney—Steinberg & Blake

[57] ABSTRACT

A vas valve adapted to be situated in a human vas deferens for closing and opening the latter. The valve includes an inner component having at one end a bored valve body and having a stem fixed to and extending from the valve body. An outer component houses the valve body of the inner component and part of the stem adjacent thereto, this outer component consisting of integrated molecular layers one of which forms an inner surface of the outer component and fluid-tightly engages and is complementary to an outer surface area of the inner component. The outer component has open-ended tubular extensions extending in opposite directions from the valve body and communicating with the bore thereof when the inner component is turned with respect to the outer component to an open position. These tubular extensions are adapted to be situated along the tubular interior of a human vas while the stem extends laterally through and beyond the vas wall and terminates in an outer operating end portion enabling the inner component to be turned between closed and opened positions. The size of the valve is small enough for location within a vas without substantially distending the vas while at the same time the hollow interiors of the tubular extensions and bore of the valve body have a diameter large enough to provide for substantially unrestricted flow through the vas when the valve is in its open position.

11 Claims, 6 Drawing Figures

INVENTOR.
LOUIS BUCALO

VAS VALVE

BACKGROUND OF THE INVENTION

The present invention relates to valves.

In particular, the present invention relates to valves constructed so as to be inserted into and remain permanently within the human body.

In particular, the present invention relates to a valve adapted to be accommodated within a human vas deferens, hereinafter referred to as the vas.

As is well known, vasectomies are performed in order to achieve sterility in the adult human male. While such operations are simple and effective, they suffer from the extremely serious drawback of being irreversible, for all practical purposes. Once a vasectomy is performed it is almost impossible to reestablish flow through the vas. It is theoretically possible to perform a second operation reestablishing communication in the vas at the location where the original surgical excision took place, but the initial vasectomy is invariably performed with a view toward achieving permanent sterility, and at best reestablishing flow through the vas would involve extremely complex, expensive, and delicate procedures.

At present there is no known way to close the vas temporarily and again conveniently open it in the event that flow therethrough is again desired.

SUMMARY OF THE INVENTION

It is accordingly a primary object of the present invention to provide the possibility of conveniently and with simple surgical procedures closing the vas reliably in a manner which will enable convenient opening thereof at any future time, if so desired.

In particular, it is an object of the invention to provide a valve which can conveniently be inserted into the vas and which can be manipulated for closing the vas and for subsequently reopening the vas.

Thus, it is an object of the present invention to provide a valve which is on the one hand small enough to be accommodated within the vas without any substantial distention thereof while on the other hand it is large enough to provide for unrestricted flow through the vas when the valve is opened.

It is especially an object of the present invention to provide a valve of this nature which will have relatively movable components coacting in a fully fluid-tight manner while at the same time assuring the movability of one component relative to the other without undesirable resistance to this movement.

Also, it is an object of the invention to provide for a valve of this nature the possibility of reliably locking the valve releasably in its closed position.

Furthermore, it is an object of the present invention to provide a valve of this type which is capable of forming an intimate union with that part of a vas wall through which the valve structure extends to the exterior of the vas.

According to the invention the vas valve includes an inner rotary component having at one end a valve body formed with a bore passing therethrough and also having a stem extending from the valve body. An outer component houses the valve body and that part of the stem which is directly adjacent thereto. This outer component consists of integrated molecular layers, one of which forms the inner surface of the outer component and fluid-tightly engages and is complementary with an exterior surface area of the valve body and stem portion adjacent thereto. This outer component has a pair of hollow, open-ended tubular extensions respectively extending in opposite directions from the valve body and communicating with the bore thereof when the inner component is turned to an open position with respect to the outer component. These tubular extensions are adapted to be situated along the tubular interior of a vas while the stem extends laterally through the vas wall and terminates in an outer operating end portion situated beyond the vas wall so that through this operating end portion it is possible to turn the inner component between its open position and a closed position where the bore of the valve body no longer communicates with the tubular extensions and instead the valve body cuts off communication between the tubular extensions. While the size of the valve is such that the tubular extensions thereof can be situated within the vas without any substantial distention thereof, at the same time the diameters of the bore and the hollow interiors of the tubular extensions are sufficiently large so that substantially unrestricted flow through the vas can be achieved when the valve is placed in its open position.

BRIEF DESCRIPTION OF DRAWINGS

The invention is illustrated by way of example in the accompanying drawings which form part of this application and in which:

FIG. 3 is a longitudinal sectional elevation of another embodiment of a valve of the invention, also illustrated within a schematically represented vas;

FIG. 4 is a longitudinal sectional elevation of another embodiment of a valve of the invention, also shown in a schematically represented vas;

DESCRIPTION OF PREFERRED EMBODIMENTS

Figure 1:
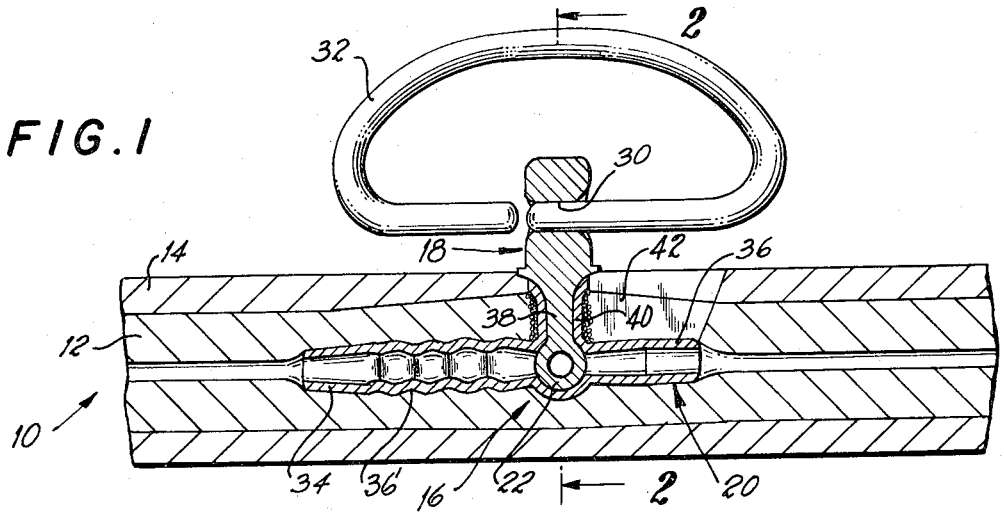
FIG. 1 is a longitudinal sectional elevation showing the valve in its closed position and schematically illustrating the part of the vas which receives the valve of the invention.

Referring now to FIG. 1, there is schematically represented therein a vas 10 which includes the vas proper 12 surrounded by tissue 14. Situated within the vas 10 is the valve 16 of the present invention. This valve 16 includes an inner component 18 and an outer component 20. The inner component 18 has at one end a valve body 22 which is of a spherical configuration in the illustrated example and which is formed with a bore 24 passing therethrough. As is apparent particularly from FIG. 2, the bore 24 extends perpendicularly across the axis of an elongated stem 26 of the inner component 18. The stem 26 and valve body 22 are integral, and the entire inner component 18 can rotate about the axis of the stem 26 thereof. The stem 26 terminates distant from the valve body 22 in an outer operating end portion 28 situated beyond the vas 10 and formed with a bore 30 passing therethrough.

This bore 30 receives part of a wire handle 32 which is accessible beyond the vas for manual turning of the inner component 18 between the illustrated closed position and an open position angularly displaced about the axis of the stem 26 through 90° with respect to the closed position. In the open position of the valve the axis of bore 24 coincides with the axis of the hollow tubular interior of the vas 10 while in the closed position of the valve the axis of the bore 24 extends perpendicularly across the hollow interior of the vas. The handle 32 is curved laterally in the manner shown in FIG. 2 so that it can be swung in a counterclockwise direction, as viewed in FIG. 2, from the position shown in FIG. 2 into an inoperative rest position where it will be situated directly alongside the vas 10.

The outer component 16 of the valve consists of integrated molecular layers of a material which is compatible with the human vas. The inner component 18 is also made of such material. For example, the valve components may be made of gold, although other materials such as platinum or rhodium may be used.

The valve of the present invention may be constructed in a manner shown in applicant's copending application, Ser. No. 826,992, filed May 22, 1969. Thus, the outer component is deposited by gas vapor deposition, by electrolytic deposition, by electroless deposition, or the like, on suitable cores which are subsequently removed as well as directly on the valve body 22 and the part of stem 26 located directly next to the valve body 22. This deposition of molecular layers one upon the other is continued until the wall thickness of the outer component 16 has reached a desired magnitude. Upon removal of the cores the component 16 will have the hollow, open-ended tubular extensions 34 and 36 which communicate with the bore 24 when the valve is in its open position and which extend along the axis of the vas in opposite directions from the valve body 22. In the position of the parts shown in FIG. 1 the tubular extension 34 which is longer than the extension 33 forms the upstream extension of the outer component 16. This extension 34 is formed with a series of annular constrictions 36 distributed along the extension 34 in order to enhance the mounting of the valve in the vas.

The part 38 of the stem 26, which is directly adjacent to the valve body 22, is of a lesser diameter than the outer operating end portion 28 of the stem 26, and this part 38 is surrounded by a tubular portion 40 of the outer component 16. As a result of the deposition of the integrated molecular layers which form the component 16, the innermost molecular layer forms the inner surface of the component 16 and has a fluid-tight engagement with the exterior surface of inner component 18 at its part 38 as well as at the entire exterior surface of valve body 22 except the portions of this latter surface which communicate with the tubular extensions 34 and 36. This inner surface of the outer component 16 is precisely complementary to the exterior surface of the inner component which it engages, and as a result of the deposition of the integrated molecular layers a reliable fluid-tightness is achieved while at the same time the inner component 18 can be turned with respect to the outer component 16 without the requirement of overcoming an undesirably large force of friction. Thus, with this particular construction a perfectly reliable fluid-tightness is achieved with the possibility of conveniently turning the valve between its open and closed positions.

The valve is inserted into the vas after a relatively short longitudinal slit 42 is formed in the vas. This slit is schematically represented in FIGS. 1, 3, and 4. After the slit 42 is formed, the surgeon can readily introduce the extension 34 into the interior of the vas into the position shown in FIG. 1, and then the rest of the valve can be introduced into the vas until it assumes the position shown in FIG. 1. The wall of the vas will of course heal at the slit 42 so as to close the latter.

In order to form an intimate union with the vas wall, a suitable means surrounds the tubular portion 40 of the outer component 16. In the illustrated example this means 44 takes the form of a fine gold wire which is simply wound directly around the tubular portion 40 of the outer component 16 so as to provide the valve at the exterior of the tubular portion 40 with an irregular exterior surface structure having many interstices into which the tissue can grow for the purpose of achieving the desired intimate bond or union with the valve. Thus, this structure forms a filament means wound around and surrounding the tubular portion 40 of the outer component 16 for promoting ingrowth of tissue into tight engagement with the outer surface of the outer component.

The size of the valve components is chosen so that the valve is small enough to be introduced into the vas without substantially distending the vas. On the other hand, the hollow interiors of the tubular extensions 34 and 36 as well as the bore 24 have diameters large enough to provide for substantially unrestricted flow through the valve and along the tubular interior of the vas when the valve is turned to its open position.

In an actual construction of the valve of the invention the spherical valve body 22 has a diameter of 0.040 inch while the tubular extensions have a diameter of 0.020 inch. Thus, the diameter of each tubular extension may be considered as being roughly equal to one-half the diameter of the spherical valve body 22.

Figure 2:
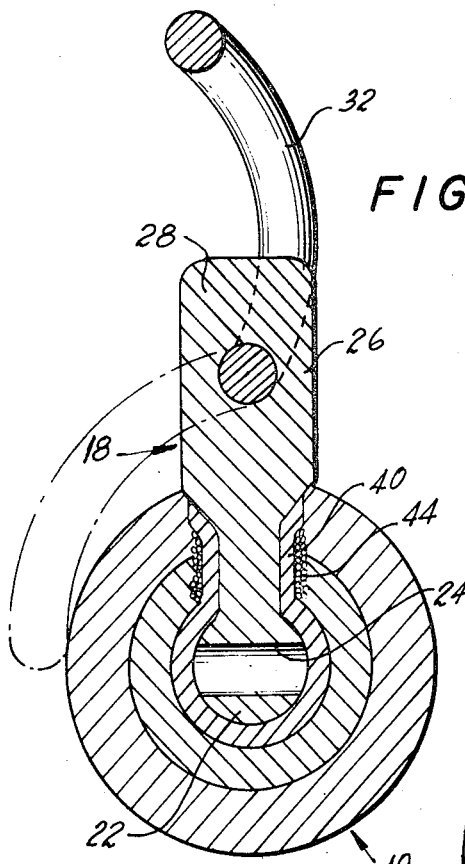
FIG. 2 is a transverse section, at a scale enlarged as compared to FIG. 1, taken along line 2—2 of FIG. 1 in the direction of the arrows.

After the above-described valve of the invention has been introduced into the vas in the manner described above, the valve is initially situated in its closed position shown in FIGS. 1 and 2, and then the handle 32 is turned down to the dot-dash line position indicated in FIG. 2. If at any future time it is desired to open the valve, the surgeon need only provide access to the handle 32 which can again be turned up to the solid line position shown in FIG. 2, whereupon the inner component 18 can be turned through 90° from the position shown in FIGS. 1 and 2, so as to provide communication of the tubular extensions 34 and 36 through the bore 24. The handle 32 can now be turned to a position extending across and located closely adjacent the vas, and whenever it is desired to close the valve the parts can be returned readily to the position shown in the drawings.

The embodiment of the invention which is illustrated in FIG. 3 is identical with that of FIGS. 1 and 2, except for the following differences, and the identical components are designated by the same reference characters. Thus, in the embodiment of FIG. 3 the exterior surface of the outer component 16 is covered with a coating 46 which is a plastic coating. This coating may be a silicone rubber coating, preferably Silastic which is known to be compatible with human tissue.

Also, in the embodiment of FIG. 3, instead of a handle 32, there is an elongated springy wire handle 48 having one end 50 received in the bore 30 and having an opposed tapered enlarged end 52. This handle is more compact in that it does not extend to the same distance from the operating end portion of inner component 18 and can just as readily be turned down to an inoperative position. Also, if desired it can be removed and simply connected with the operating end portion of the inner component 18 whenever it is desired to change the position of the valve. Except for these differences the embodiment of FIG. 3 is identical with that of FIGS. 1 and 2. The wire handles 32 or 48 may be made of a metal such as tantalum.

Figure 5:
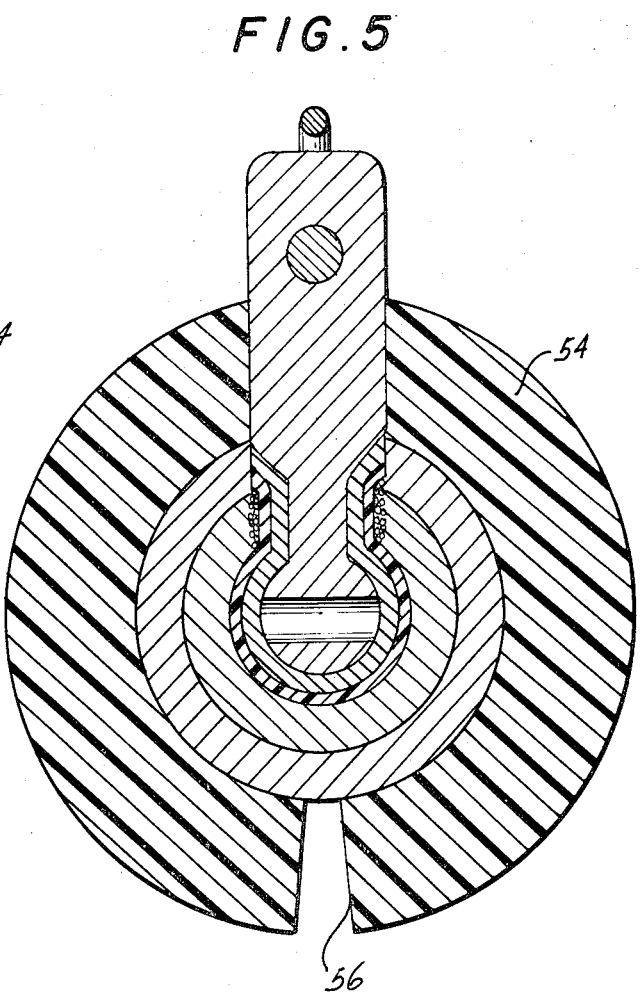
FIG. 5 is a transverse section at a scale which is enlarged as compared to FIG. 4, taken along line 5—5 of FIG. 4 in the direction of the arrows.
Figure 6:
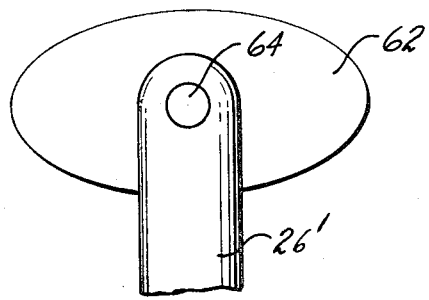
FIG. 6 is an enlarged representation of another embodiment of a handle which may be mounted on the outer operating end portion of the valve stem.

The embodiment of FIGS. 4 and 5 is identical with that of FIG. 3 except that this embodiment includes a longitudinally split, springy, tubular plastic shroud 54 which can be expanded at its axially extending slit 56 so that it can readily be placed around the vas. The shroud 54 is formed with a bore 58 through which the stem 26 extends with the operating end portion 28 thereof situated beyond the shroud. After the shroud is placed in its position surrounding the vas and receiving the stem 26 through the bore 58, the end 50 of the handle 48 is introduced into the bore 30. At its upper surface, as viewed in FIG. 4, the shroud 54 is formed with an axially extending recess or groove 60 extending along the shroud to the right from the bore 58 thereof, as viewed in FIG. 4. The width of the groove 60 is just great enough to receive the springy enlarged end 52 of the handle 48. With this end 52 in the groove 60, the shroud acts as a lock means releasably locking the valve in its closed position. However, due to the springy nature of the handle 48, the locking portion 52 thereof can be displaced beyond the locking recess 60 of the lock means which is formed by the shroud 54, and thus it is possible to displace the valve between its open and closed positions. FIG. 6 shows a variation where the outer end portion of the stem 26', which corresponds to the stem 26, is formed with an axially extending notch receiving an oval-shaped handle 62. A cross pin 64 is provided for retaining the handle 62 in its operative position in the slit or notch which extends through the stem 26' in a diametral plane thereof. Thus, through this simple expedient it is also possible to provide a handle for the valve invention.

Thus, with the present invention surgical excision as required in a conventional vasectomy with resulting permanent sterility is completely avoided. All that is required is a simple incision 42 in order to enable the valve of the invention to be introduced, and then this valve of the invention can remain as long as desired in its closed position to provide the desired sterility until such time as it may be desired to open the valve so as to reestablish flow through the vas.

What is claimed is:

1. A vas valve comprising an inner rotary component having a valve body and a valve stem fixed to and extending from said body, and an outer component housing said valve body and part of said stem adjacent to said valve body, said outer component having hollow, open-ended tubular extensions extending in opposite directions from said valve body and said body being formed with a bore providing communication between said extensions when said inner component is in an open position, said stem terminating distant from said body in an outer operating end portion accessible for turning said inner component with respect to said outer component to a closed position where said bore is out of communication with said tubular extensions and said body cuts off communication therebetween, said components being made of materials compatible with a human vas and having a size small enough to situate said tubular extensions along the tubular interior of a human vas without substantial distention thereof and with said stem of said inner component extending laterally through a wall of the vas and having its operating end portion accessible at the exterior of the vas, so that the inner component can be turned between its open and closed positions, and said tubular extensions and bore all having an inner diameter great enough to provide normal unrestricted flow through the vas when said inner component is in its open position, said outer component having a tubular portion surrounding and fluid-tightly engaging that part of said stem which is directly adjacent said body of said inner component, and filament means extending around and surrounding said tubular portion of said outer component for promoting ingrowth of tissue into tight engagement with the outer surface of said outer component.

2. The combination of claim 1 and wherein said filament means is in the form of a fine wire wound around said tubular portion of said outer component.

3. The combination of claim 2 and wherein said wire is a fine gold wire.

4. The combination of claim 1 and wherein one of said tubular extensions is formed with a series of annular constrictions distributed therealong.

5. The combination of claim 1 and wherein a handle is operatively connected with said operating end portion of said stem.

6. The combination of claim 5 and wherein said operating end portion of said stem is formed with a bore receiving part of said handle and said handle being turnable in said bore between in inoperative position situated directly next to the vas and an operative position projecting from said operating end portion of said stem.

7. The combination of claim 5 and wherein a lock means coacts with said handle for releasably locking the latter at a position locating said inner component in its closed position.

8. A vas valve comprising an inner rotary component having a valve body, and an outer component housing said valve body and part of said stem adjacent to said valve body, hollow, open-ended tubular extensions extending in opposite directions from said valve body and said body being formed with a bore providing communication between said extensions when said inner component is in an open position, said stem terminating distant from said body in an outer operating end portion accessible for turning said inner component with respect to said outer component to a closed position where said bore is out of communication with said tubular extensions and said body cuts off communication therebetween, said components being made of materials compatible with a human vas and having a size small enough to situate said tubular extensions along the tubular interior of a human vas without substantial distention thereof and with said stem of said inner component extending laterally through a wall of the vas and having its operating end portion accessible at the exterior of the vas, so that the inner component can be turned between its open and closed positions, and said tubular extensions and bore all having an inner diameter great enough to provide normal unrestricted flow through the vas when said inner component is in its open position, a handle operatively connected with said operating end portion of said stem, and a lock means coating with said handle for releasably locking the latter at a position locating said inner component in its closed position, said lock means including an elongated tubular longitudinally split shroud formed with an opening through which said stem extends and beyond which said operating end portion of said stem and handle are located, said handle having a springy locking portion and said shroud being formed in its exterior with a locking recess releasably receiving said springy locking portion of said handle for releasably locking said inner component.

9. The combination of claim 1 and wherein an elongated tubular longitudinally split shroud is adapted surround the vas and is formed with a bore through which said stem extends and beyond which said operating end portion of said stem is located.

10. The combination of claim 1 and wherein said outer component has an exterior surface covered with a coating.

11. The combination of claim 10 and wherein said coating contains silicone.

* * * * *